Patented Mar. 14, 1950

2,500,727

UNITED STATES PATENT OFFICE 2,500,727

TREATMENT AND PURIFICATION OF CLAY

Harry Whittaker, Elizabeth, N. J., assignor to Georgia Kaolin Company, Elizabeth, N. J., a corporation of New Jersey No Drawing. Application August 6, 1949, Serial No. 109,067

7 Claims. (Cl. 23—110)

This invention relates to a process of treating clay and like materials such for example as kaolin, kaolinite and halloysite.

An object of the inventoin is to produce an improved purified clay essentially free from contaminating soluble salts such as alum, ferrous sulphate, zinc salts and other salts normally introduced in the customary processing of clay. Other objects are:

(1) To improve the color (whiteness and brightness) of clay over that possible of attainment with the usual bleaching methods, such clays being especially desirable for use in coating paper.

(2) To control the soluble salt content of clays both in the processing of the clay and in the finished clay.

(3) To reduce the conductivity of clay-water suspensions in which finished clay is used.

(4) To control the pH of finished clay as may be required and over wider limits than heretofore possible.

(5) In some instances, to eliminate the use of acids or acid salts heretofore necessary to accomplish fast filtering of clay from its suspension. Such salts in part remain in the clay after filtering and are objectionable in many cases in the ultimate use of the clay, as for example where the clay is used in ceramic bodies and slips and as extenders in water-emulsion paints.

It is current practice in the preparation of clay for use in paper coating and paper filling or for use in rubber or paints, to first mix or blunge in water the crude clay as it is taken from the mine. A sodium salt of a weak acid is added in an amount up to ½ per cent to make the suspension fluid and thus enable the maximum quantity of clay to be processed at a time. The fluid slip is passed through troughs known as "sand boxes" or "mica drags" and over screens to remove coarse impurities such as grit, sand, mica, etc. After degritting, the clay may be further processed, depending upon its ultimate use. Paper coating clays may be fractionated by means of a continuous centrifuge and the fine fraction still in suspension may be given a chemical bleach. The bleaching operation generally involves the addition of an acid or an acid salt such as alum to lower the pH and render more soluble the discoloring salts removed from the clay, and a chemical or chemicals capable of reducing the discoloring oxides. Sulphites are commonly used as reducing agents.

Clays which are to be used for ceramic purposes are normally not bleached but may be fractionated to controlled grain sizes, but whether or not the clay is bleached it is finally dewatered and dried. To facilitate dewatering, the clay is acidified and thereby flocculated by the additon of ¼ to ½ per cent of an acid or acid salt. Bleached clays do not usually require further additions of acid salts since they come from the bleaching operation in flocculated condition. The chemicals added during processing are partially removed in the filter water but large portions remain entrapped in the filter cake. These chemicals remaining in the filter cake are dried on to the clay in the subsequent drying operation.

Thus it may be readily seen that finished clays contain quantities of contaminating chemicals as a result of their preparation. Most finished clays are acid, that is they exhibit a pH below 7. They are frequently highly buffered, in which condition they may give rise to difficulties in processing in their ultimate use.

I have found that many of the objectionable and undesirable effects resulting from the presence of residual contaminating chemicals introduced in the processing of clay are eliminated when the partially processed clay is treated with so-called ion exchange materials in the manner hereinafter set forth. Many available substances exhibit ion exchange characteristics and are well known. Among such materials are the zeolites; sulphonated or sulphited insoluble phenol-formaldehyde resins, sulphonated coal, lignin, peat and other sulphonated humic organic materials. Ion exchange "resins" are available commercially in granulated form. These resins, known under the trade names of "Ionac," "Amberlite," etc., are particularly suited to my process.

In carrying out my process, in general, a clay which has been dispersed with a sodium salt of a weak acid in water, passed over sand boxes, acidified and bleached, is contacted sequentially with an anion exchanger in its OH form and with a cation exchanger in its hydrogen form. The use of the two exchangers can be reversed so that the aqueous clay suspension is contacted first with a cation exchanger in its hydrogen form and thereafter with an anion exchanger in its OH form. Or, the two exchangers, cationic and anionic, may be contacted at the same time. The ion exchanger is stirred into the clay slip and allowed to react for a few minutes. The exchanger is then separated from the clay slip by passing the mixture over a screen, the granular exchanger particles being retained on the screen and the clay slip free of the resin passing through the screen. The clay slip may then be filtered and dried in the usual manner. Instead of contacting the clay suspension with the exchanger by stirring the exchanger into the clay slip, the slip may be percolated through a column or bed of the exchanger, or the slip might be passed over and through a grid, the bars of which are hollow and perforated and filled with exchanger, the slip thereby contacting and permeating the resin exchanger as it passes over the grid.

The following example illustrates the process of treating clay to improve its brightness over that obtained by the usual bleach alone.

EXAMPLE I 20 parts by weight of a Georgia kaolin from Dry Branch was blunged with 80 parts of water, to which was added .06 part tetrasodium pyrophosphate. Grit and mica were settled out in the usual manner. The suspension was then acidified with alum and then bleached with 8 pounds per ton of zinc hydrosulphite. Following the bleaching, 4 parts by weight of an anion exchange resin known in the trade as "A300" anion exchange resin sold by American Cyanamid Company, of 60 mesh size, was stirred into the suspension. The "A300" resin is a hydroxide activated synthetic resin. The resin was then separated from the suspension by passing through a 100 mesh screen. Four parts by weight of a cation exchange resin in its hydrogen form, sold by American Cyanamid Company under the trade name "C-200" exchange resin was then stirred into the suspension and the resin removed by screening. The "C-200" resin is a hydrogen activated sulphonic acid synthetic resin. The treated clay slip was filter pressed and dried. The finished clay had a pH of 4.5. When measured with a G. E. brightness meter it exhibited a brightness factor of 87.2. The same clay bleached in the above same manner, but not treated with exchange resins, gave a brightness value of 84.3. The treated crude clay had a brightness of 80.6.

It is thought that the ion exchange treatment may assist in preventing reversion of the solubilized iron compounds by reason of the pH effected and thus hold in solution the iron salts until they can be removed in the filtrate, thereby preventing reprecipitation of the undesirable iron salts on to the clay in the subsequent drying operation. The ion exchange treatment may also remove iron salts prior to filtering, thereby producing a filter cake much freer of iron salts than heretofore possible. At any rate, the finished clay made by the process herein disclosed is substantially whiter and brighter than normally possible and is therefore highly desirable for use in coating mixes for coating paper.

In addition to improving the color of the clay, it has been observed that the ion exchange treatment herein disclosed causes an appreciable reduction in the concentration of sulphates, sulphite, etc. in the finished clay. Such salts have an influence on the viscosities and workability of paper coating slips and in many cases are difficult to control.

Clays of high soluble salt content resulting from necessary salt additions in processing exhibit undesirable effects on the flow properties of water emulsion paints. Such clays are purchased on a "conductivity" specification. It is difficult to produce a finished clay having a sufficiently low conductivity value to meet the requirements of paint manufacturers by the usual process wherein dispersing and coagulating salts, such as for example sodium silicate or tetrasodium pyrophospate and alum, respectively, are used. I have found that clays having exceptionally low conductivity values result if after processing in the usual manner through the bleaching stage, the clay before filtering is treated sequentially with an anion exchange resin in OH form and with a cation exchange resin in its hydrogen form, the anion exchange resin treatment either preceding or following or being used simultaneously with the cation exchange resin treatment. The effect of my treatment on the conductivity of a clay is shown by the following example.

EXAMPLE II 20 parts Georgia kaolin in 80 parts water were dispersed with tetrasodium pyrophosphate, acidified with alum and bleached with zinc hydrosulphite. Separate portions of the bleached suspension were then treated with exchange resins as follows:

Slip No. 1 was treated with 4 parts "A300" resin (anion exchange resin in its OH form) per 100 parts of slip.

Slip No. 2 was treated with 4 parts "C-200" resin (cation exchange resin in its hydrogen form) per 100 parts of slip.

Slip No. 3 was treated with 4 parts "A300" resin and after allowing a few minutes for the exchange reaction to take place, the resin was removed from the slip by screening and then the slip was treated with 4 parts of "C-200" resin.

Slip No. 4 was treated with 4 parts "C-200" resin and after allowing a few minutes for the exchange reaction to take place, the resin was removed from the slip by screening and then the slip was treated with 4 parts "A300" resin.

In each case, after allowing a few minutes for the exchange reaction to take place, the resins were separated from the slips and the slips were filter pressed and the filter cakes tested for resistivity by means of a conductivity bridge. The following table gives the results:

Table I

| | pH | Resistivity |
|---|---|---|
| | | Ohms |
| Slip untreated | 5.1 | 16,000 |
| No. 1 Slip, A-300 resin | 6.7 | 29,000 |
| No. 2 Slip, C-200 resin | 3.0 | 27,500 |
| No. 3 Slip: | | |
| A-300 resin | | |
| C-200 resin | 4.5 | 42,000 |
| No. 4 Slip: | | |
| C-200 resin | | |
| A-300 resin | 5.1 | 45,000 |

These data show that in order to obtain the greatest increase in resistivity of the finished slip, both an anion exchanger and a cation exchanger must be used, although they may be used in either order or together. The pH of the finished clay can be controlled, depending upon the type and sequence of use of the anion and cation exchangers.

Sulphates are oftentimes detrimental to the processing of ceramic casting slips. I have found that a ceramic clay when treated with both an anion exchange resin and a cation exchange resin, either resin being used first, or the two resins used together, can be filtered readily to produce a clay which is essentially free of alum salts.

The following example illustrates the preparation of a clay suitable for ceramic use, which process eliminates the customary acid or acid-salt addition generally employed to flocculate the clay to cause it to filter more easily.

EXAMPLE III 20 parts of Georgia kaolin is dispersed with tetrasodium pyrophosphate in 80 parts water and is then degritted in the usual manner. 4 to 8 parts of an anion exchanger, such as "A300" resin in its OH form is first stirred into the slip. After a few minutes' contact, the resin is removed from the slip on an 80 mesh screen. Then a cation exchanger, such as "C-200" resin in its hydrogen form, is added, allowed to react for a few minutes and screened out. The slip is now at a low pH and in a flocculated condition suitable for filtering. The slip is filter pressed and dried. A clay prepared in this manner shows a smooth, steadily rising pH curve when titrated with a .1 N sodium hydroxide solution.

In the claims where the expression is used "contacting an aqueous suspension of clay sequentially with an anion exchanger in its OH form and with a cation exchanger in its hydrogen form," it is intended that the expression cover the use of the anion exchanger either before or after the cation exchanger.

The invention is not limited to the examples or the preferred procedures which have been given merely by way of illustration but may be embodied or practiced within the scope of the following claims.

I claim:

1. The process of treating clay and like materials containing contaminating soluble salts, which comprises contacting an aqueous suspension of clay with an anion exchanger in its OH form and with a cation exchanger in its hydrogen form, and separating said exchangers from the clay suspensions.

2. The process of treating clay and like materials containing contaminating soluble salts, which comprises contacting an aqueous suspension of clay first with an anion exchanger in its OH form, separating said anion exchanger from the clay suspension, and thereafter with a cation exchanger in its hydrogen form, and separating said cation exchanger from the clay suspension.

3. The process of treating clay and like materials containing contaminating soluble salts, which comprises contacting an aqueous suspension of clay first with a cation exchanger in its hydrogen form, separating said cation exchanger from the clay suspension, and thereafter with an anion exchanger in its hydrogen form, and separating said anion exchanger from the clay suspension.

4. The process of treating clay and like materials, which comprises treating an aqueous suspension of clay with a dispersing agent, settling out coarse particles, acidifying the suspension to flocculate the clay, bleaching the clay, contacting an aqueous suspension of the bleached clay sequentially with an anion exchanger in its OH form and with a cation exchanger in its hydrogen form, and separating said exchangers from the clay suspensions.

5. The process of treating clay and like materials, which comprises treating an aqueous suspension of clay with tetrasodium pyrophosphate, settling out coarse particles, acidifying the suspension with alum to flocculate the clay, bleaching the clay with zinc hydrosulphite, contacting an aqueous suspension of the bleached clay sequentially with an anion exchanger in its OH form and with a cation exchanger in its hydrogen form, and separating said exchangers from the clay suspensions.

6. The process of treating clay and like materials, which comprises treating an aqueous suspension of clay with a dispersing agent, settling out coarse particles, contacting the aqueous clay suspension with an anion exchanger in its OH form, separating said anion exchanger from the clay suspension, thereafter contacting said clay suspension with a cation exchanger in its hydrogen form, and separating said cation exchanger from the clay suspension.

7. The process of treating clay and like materials, which comprises treating an aqueous suspension of clay with a dispersing agent, settling out coarse particles, contacting the aqueous clay suspension at the same time with an anion exchanger in its OH form and with a cation exchanger in its hydrogen form, and separating said exchangers from the clay suspension.

HARRY WHITTAKER.

REFERENCES CITED

The following references are of record in the file of this patent:

Tiger et al., "Demineralizing Solutions by a Two-Step Process," Industrial and Engineering Chemistry, vol. 35, No. 2 (Feb. 1943), pp. 186-192.

Certificate of Correction

Patent No. 2,500,727 March 14, 1950

HARRY WHITTAKER

It is hereby certified that error appears in the printed specification of the above numbered patent requiring correction as follows:

Column 3, line 46, before "pH" insert the word *low*;

and that the said Letters Patent should be read with this correction therein that the same may conform to the record of the case in the Patent Office.

Signed and sealed this 27th day of June, A. D. 1950.

[SEAL]

THOMAS F. MURPHY,
*Assistant Commissioner of Patents.*